No. 702,955.  
A. JOHNSON.  
SINKER FOR FISHING NETS.  
(Application filed Apr. 8, 1902.)  
Patented June 24, 1902.
(No Model.)
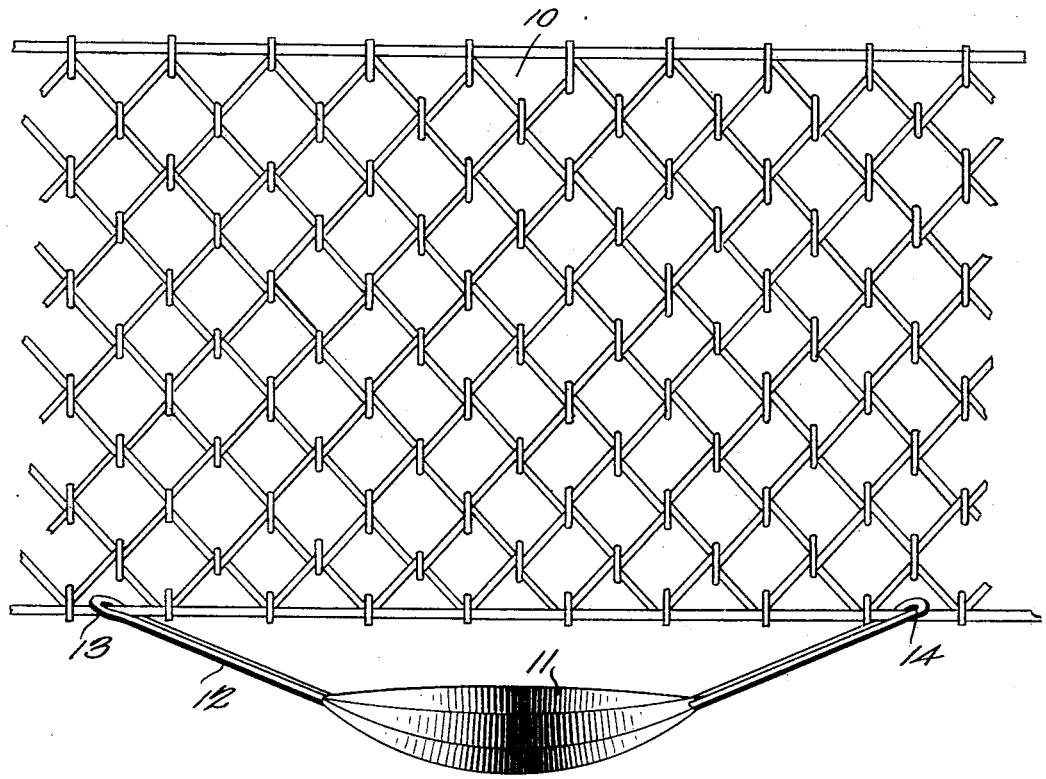
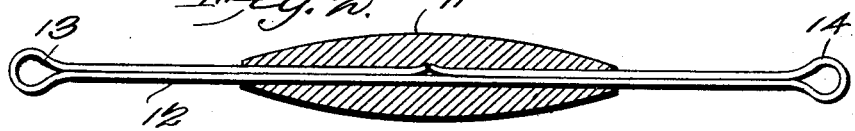

UNITED STATES PATENT OFFICE.

ARON JOHNSON, OF ESCANABA, MICHIGAN.

SINKER FOR FISHING-NETS.

SPECIFICATION forming part of Letters Patent No. 702,955, dated June 24, 1902.

Application filed April 8, 1902. Serial No. 101,937. (No model.)

*To all whom it may concern:*

Be it known that I, ARON JOHNSON, a subject of the King of Sweden and Norway, residing at Escanaba, in the county of Delta and State of Michigan, have invented a new and useful Sinker for Fishing-Nets, of which the following is a specification.

This invention relates to fishing-nets, more particularly to the class known as "gill-nets," and has for its object the production of a sinker adapted to be attached to the net at suitable intervals and so constructed as to prevent the sinker from becoming entangled in the meshes of the net or from being caught by weeds or other obstructions in the water.

Other novel features will appear in the annexed description and be particularly specified in the claims.

In the drawings illustrative of the invention, Figure 1 represents a portion of a fishing-net with one of the improved sinkers attached thereto. Fig. 2 is a horizontal section of the sinker detached.

The sinker may be attached to any form of net, but is more particularly applicable to gill-nets, seines, and similar nets, which are supported vertically in the water and operated by being drawn through the water and at times in engagement with the bottom, and in the drawings a section of a net of this kind is shown at 10.

The sinker consists of a body portion 11, of lead or other heavy material, having a wire 12 running through it and extended at the ends and formed into loops 13 14. The body portion is curved downward in the center and tapers toward each end and merges into the outlines of the wire 12 at the ends, so that there are no "shoulders" or projections on any part of the device to engage weeds, stones, or other obstructions on the bottom of the fishing-ground. The bottom outlines of the sinker are therefore in a long curve, which causes it to freely pass over all obstructions and not be caught or retarded by them. The wire 12 also extends upwardly and outwardly from the ends of the body portion to the loops 13 14, as shown, so that the loops 13 and 14 are at a comparatively long distance apart and the total length of the sinker thereby materially increased, thus correspondingly increasing the length of the curve of the lower outline of the device and greatly increasing its efficiency. The holding-wire is formed in a single piece doubled together with the ends embedded in the body portion together with the main strand of the wire and with the loops 13 14 formed at the turns of the wire at the ends. The body portion being of lead is cast around the central part of the loop, and thereby permanently attached thereto.

The device is extremely simple and easily applied, and by its peculiar form the tendency to become dislodged or detached from the net is very remote. They may be made of any required size to adapt them to different sizes of nets and may be readily applied to all the various uses for which devices of this class are employed. Preferably the body portion 11 will be substantially square in cross-section, but may be of any other shape desired.

In the drawings the sinker is shown attached to the lowermost or marginal strand of the net by threading said strand through the eyes 13 and 14 at the extremities of the holding-wires, in which case of course it would be necessary to connect the sinkers with the net when the latter is made or by cutting and splicing the strand; but it will be understood that any particular method of attachment may be employed without departing from the spirit or sacrificing any of the advantages of the invention.

What is claimed is—

1. As a new article of manufacture, a sinker consisting of a downwardly-curving body portion having holding-wires extending upwardly and outwardly from the ends and with said body portion tapering in opposite directions from the center and merging into the outlines of the holding-wires, substantially as described.

2. As a new article of manufacture, a sinker consisting of a body portion curving downwardly and tapered in opposite directions toward the ends, and a holding-loop formed of a single piece of wire doubled together with the ends disposed intermediately of the loop and embedded centrally in said body portion, and extending in opposite directions upwardly and outwardly from said body portion, substantially as described.

3. As a new article of manufacture, a sinker for fishing-nets having remote terminal net-engaging means disposed at an interval sufficient to engage a marginal strand of the net in differing meshes, and bowed outwardly from the marginal strand between the terminal engaging means.

In testimony that I claim the foregoing as my own I have hereto affixed my signature in the presence of two witnesses.

ARON JOHNSON.

Witnesses:
MARY BUCHANAN,
CLARA HAMACHER.